June 16, 1925.
M. F. F. WILSON
ARTIFICIAL FLOWER
Filed Oct. 4, 1924
1,542,432
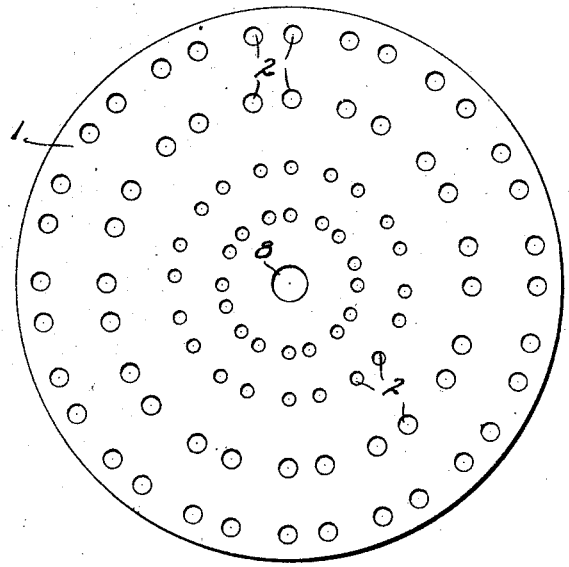
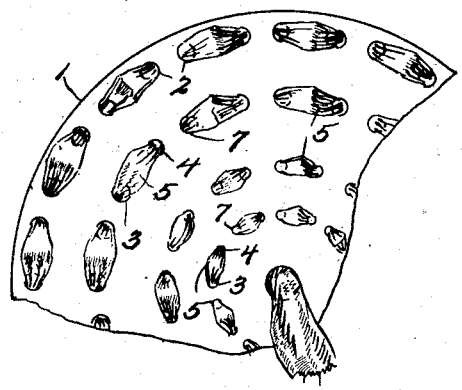
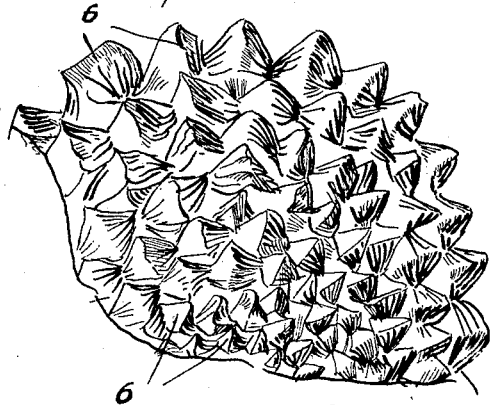
Mary F. F. Wilson Inventor
By John Boyle Jr.
Attorney

UNITED STATES PATENT OFFICE.

MARY F. F. WILSON, OF NEW ROCHELLE, NEW YORK.

ARTIFICIAL FLOWER.

Application filed October 4, 1924. Serial No. 741,776.

*To all whom it may concern:*

Be it known that I, MARY F. F. WILSON, a citizen of the United States, residing at New Rochelle, in the county of Westchester and State of New York, have invented certain new and useful Improvements in Artificial Flowers, of which the following is a specification.

My invention relates to the production of artificial flowers and one of the objects of the invention is to provide a way to make ribbon flowers, such as are worn on dresses and hats, and without having to make them up by sewing.

Referring to the drawing for a more complete disclosure of the invention:

Fig. 1 is an elevation of a celluloid base on which the flower parts are mounted;

Fig. 2 is a side view of Fig. 1;

Fig. 3 is a fragmentary rear view of a finished flower; and

Fig. 4 is a fragmentary front view of a finished flower.

At the present time, ribbon flowers are made by sewing the parts together and then sewing the finished flower on the garment. To do away with the more difficult work of sewing and to keep the finished flower in better shape when in use, I provide a base of suitable material and attach the ribbon portions of the flower thereto.

One form of the invention is illustrated in the drawing and in which 1 is a colored celluloid disc that is provided with perforations 2 of suitable size and through which I run a bodkin carrying a ribbon. While it is preferred to provide the disc with perforations before attaching the ribbon, the disc can be used without perforations being prepared in advance, in which case the perforations would be made by the bodkin.

In making a flower, the ribbon will pass through the hole 3 from the upper side of the disc and through the hole 4 from the under side, and the portion 5 of the ribbon will be drawn up tight against the under side of the disc. The ribbon will then be suitably looped as at 6 on the upper side of the disc to simulate the petals of a flower and then passed again through the next hole 7 from the upper side of the disc, the steps being repeated as before, proceeding regularly from hole to hole around each circle until the whole upper face of the disc is covered with the ribbon loops.

A center portion of the flower, sometimes of another color, will be held in place by being threaded through the central aperture 8.

When the flower is complete, it can be attached to the piece of apparel merely by sewing the disc thereto.

From the above description, it will be apparent that I have produced a device of the character described, which possesses all the features enumerated as desirable and while I have described the preferred form of my invention, it will be understood that I reserve the right to all changes properly falling within the spirit and scope of the appended claims.

Therefore, what I claim as new and desire to secure by Letters Patent is:

1. An artificial flower comprising a base provided with perforations, a ribbon threaded through the perforations to provide loop portions on the upper side of the base.

2. An artificial flower comprising a base provided with perforations, a ribbon of a greater width than the perforations threaded therethrough to provide loose portions on the upper side of the base.

3. An artificial flower comprising a base provided with perforations, a strip of flexible material threaded through the perforations to provide portions on the upper side of the base which simulate the parts of a flower.

In testimony whereof I affix my signature.

MARY F. F. WILSON.